3,313,399
LOW PRESSURE ACCUMULATOR
Maynard J. De Good, Grand Rapids, Mich., assignor to The Rapids-Standard Company, Inc., Grand Rapids, Mich., a corporation of Michigan
Filed Oct. 20, 1965, Ser. No. 498,976
4 Claims. (Cl. 198—127)

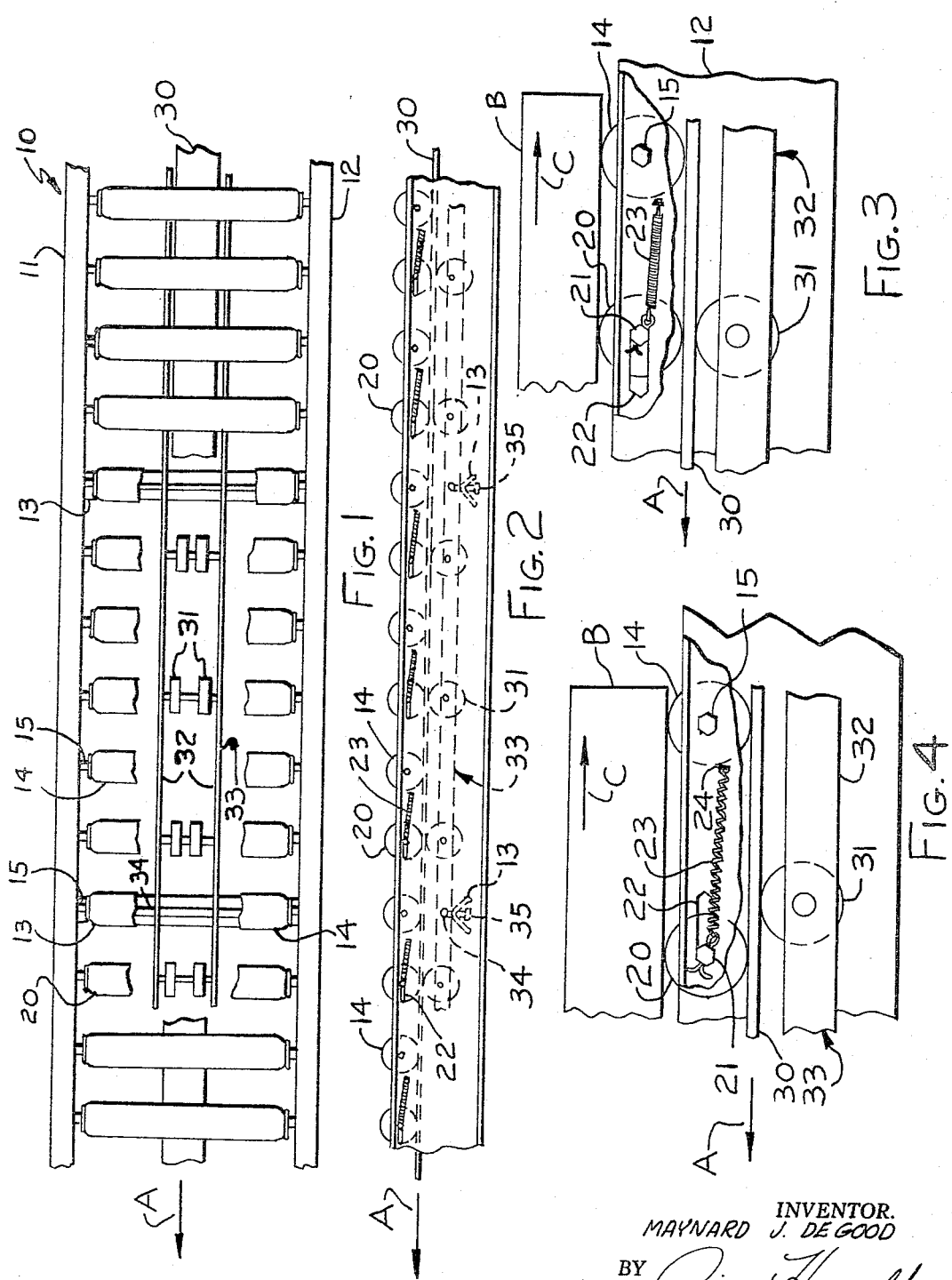

This invention relates to power driven conveyors and more particularly to a continuously operated conveyor on which the forward motion of the articles can be forcibly stopped with an automatic reduction in the amount of propelling force delivered by the propelling member to the stationary articles.

This invention is designed to provide a power operated conveyor which will automatically reduce, but not eliminate, the amount of propelling force delivered to the articles in the event the forward motion of the articles is prevented. Some propelling force is always imparted to the article but the amount of the force delivered to the article is reduced to a point where the articles will not be damaged and the load imposed upon the propelling member and its driving mechanism will not be such as to result in an overload condition.

This invention does not replace a complete release type of accumulative conveyor such as is described in U.S. Patent 3,062,359. It does however provide a much more economical construction where accumulation is intended to occur on restricted lengths of conveyor and the accumulation is not expected to be of long duration. A typical example of the invention's purpose would be its application immediately ahead of a palletizer where this invention would be useful in accumulating up to a dozen cartons and releasing them in close pack for stacking. This type of usage has different requirements than the situation where a large number of cartons are to be accumulated or it may reasonably be expected that the cartons will remain stationary on the conveyor for long periods of time.

The invention provides a low cost, light weight accumulator of minimal complexity. It provides quiet dependable service and its operation is fully automatic in response to the degree to which the articles are free to move along the conveyor.

Other objects and purposes of this invention will be understood by those acquainted with the design and manufacture of conveyors upon reading the following specification and the accompanying drawings.

In the drawings:

FIG. 1 is a fragmentary plan view, partially broken, of a conveyor incorporating this invention;

FIG. 2 is a fragmentary side elevation view of the conveyor illustrated in FIG. 1;

FIG. 3 is a fragmentary, enlarged, partially broken side elevation view illustrating an article in normal forward motion along the conveyor;

FIG. 4 is a fragmentary, enlarged, partially broken, side elevation view illustrating the operation of the conveyor when the article's forward motion is impeded.

In executing the purposes of this invention a conveyor is provided having rollers forming a conveying surface. Beneath these rollers is a constantly driven propelling member. The propelling member is supported from beneath by pressure rollers held in a fixed vertical relationship to the conveying rollers. The pressure rollers are mounted directly beneath the conveying rollers. In the preferred embodiment, the pressure rollers are so spaced one is provided beneath only alternate ones of the conveying rollers. A greater spacing can be provided within the framework of this invention.

Those of the conveying rollers which are vertically aligned with the pressure rollers are so mounted to the conveyor frame that they have a limited degree of travel lengthwise of the conveyor. These rollers are biased into vertical alignment with the pressure rollers by springs. When an article is held stationary on the conveyor surface the continued movement of the propelling member causes those of the conveying rollers which are permitted to migrate or travel lengthwise of the conveyor, to shift against the springs upstream of the conveyor and thereby become misaligned with the pressure rollers. When so repositioned, the normal weight of the belt of the propelling member is such that the frictional contact between the propelling member and the propelling roller is materially reduced, and thus the amount of propelling force delivered to the article is correspondingly reduced.

Referring now specifically to the drawings and FIGS. 1 and 2, the basic conveyor 10 is of conventional construction having a pair of side rails 11 and 12 tied together by cross ties 13 at suitable intervals. At equally spaced intervals along the conveyor, conveying rollers 14 are mounted crosswise to the conveyor track. Each of the conveying rollers 14 is mounted for free rotation on a shaft 15 the opposite ends of which extend through suitable openings in the side frame members 11 and 12. The openings for the shafts 15 are such as to prevent both vertical and horizontal movement of the shafts.

Between the fixed conveying rollers 14 migratory or shiftable conveying rollers 20 are provided. The top surfaces of the fixed conveying rollers 14 and the shiftable conveying rollers 20 are in the same horizontal plane and form a conveying surface along which articles are transported. The rollers 14 and 20 together with their supporting structure constitute the conveyor track. Each of the shiftable conveying rollers 20 is mounted for free rotation about a shaft 21. The ends of the shafts 21 extend through horizontal slots 22 in the side frame members 11 and 12. The slots are so arranged that when the shaft 21 is at one end of the slot the shiftable conveying roller 20 is positioned immediately above and in vertical alignment with one of the pressure rollers 31. The elongation of the slot extends upstream of the conveyor, that is, in the direction from which the articles are moving along the conveyor. The slots 22 are horizontal and the shiftable conveyor rollers 20 remain in the same horizontal plane at all times.

Attached to each end of each of the shafts 21 is a spring 23. The opposite end of each of the springs 23 is anchored to the conveyor frame at 24. The springs 23 have a tension value limited to that sufficient only to urge the shiftable roller 20 to that end of the slot 22 where it is vertically aligned with its cooperating pressure roller when the articles are moving freely along the conveying surface.

The conveying rollers both of the fixed type 14 and the shiftable type 20 make contact with a powered propelling member 30, preferably a narrow belt, which contacts their lower peripheries. The propelling member is driven by any suitable prime mover, a number of which are well known in the art. Since the means by which the propelling member is driven forms no part of this invention, it is neither illustrated nor described. The propelling member 30 is supported from beneath by pressure rollers 31. The pressure rollers 31 are mounted on suitable shafts supported between a pair of elongated straps 32 which form a frame 33. The frame 33, above each of the cross ties 13, is supported on the side rails 11 and 12 by a bolt 34. At its center the bolt is pressed upwardly from beneath by a stud 35 extending through the cross tie 13. By adjusting the stud 35, the frame 33 and its pressure rollers 31 can be vertically positioned to provide the precise degree of contact between the propelling member and the conveying rollers above.

In the preferred construction of this invention illustrated in the drawings, the fixed conveying rollers 14 and the shiftable conveying rollers 20 are alternately arranged along the conveyor track. Pressure rollers 31 are provided only beneath the shiftable conveying rollers 20. No pressure roller is provided beneath the fixed conveying rollers 14. It will be recognized that the number of fixed conveying rollers utilized between shiftable conveying rollers can be altered within the framework of this invention to provide for example two or three or perhaps more fixed conveying rollers 14 between each pair of shiftable conveying rollers 20. When this is done, the spacing between the pressure rollers 31 is also changed to correspond with the number of shiftable conveyor rollers utilized.

In operation, the propelling member is driven in the direction of the arrows A shown on the drawings. This causes the articles B to be propelled in the opposite direction, that is, in the direction of the arrows C shown in FIGS. 3 and 4. When the articles are moving freely along the conveyor, the springs 23 hold the shiftable propelling rollers 20 in vertical alignment with the pressure rollers 31, as shown in FIG. 3. In this situation, the propelling member 30 is trapped between the pressure rollers 31 and the shiftable propelling rollers 20 providing just sufficient contact between the shiftable propelling roller 20 and the propelling member 30 to assure transportation of the articles along the conveyor. The propelling member makes less frictional contact with the fixed propelling rollers 14. This contact being such as to produce only a limited degree of propelling force transfer from the propelling member to the articles.

When the forward motion of the articles is interrupted for any reason, the continued movement of the propelling member 30 causes the shiftable propelling rollers 20 to migrate upstream of the conveyor by rolling along the bottom surface of the article until further migration of the roller is prevented by contact between the ends of the shaft 21 and the ends of the slots 22. The shiftable roller 20 is illustrated in its maximum shifted position in FIG. 4. In its shifted position, the shiftable propelling roller 20 has moved out of alignment with its corresponding pressure roller 31 and thus the propelling member 30 is no longer as firmly held between the pressure roller and the shiftable propelling roller 20. The weight of the propelling member in the span between a pair of the pressure rollers 31 will be such that the belt will have a slight downward sag or concavity. This is sufficient to materially reduce the amount of propelling force delivered from the propelling member through the shiftable propelling roller to the article. Only a few ten-thousandths of an inch difference in the vertical position of the top surface of the propelling member will materially reduce the frictional force with which the propelling member engages the propelling rollers. It will be recognized that the greater the span between pressure rollers 31 the greater will be this effect. Thus, the propelling member will continue to apply forward propelling force to the articles, but with a substantially reduced amount of force. The presence of the articles held stationary on the conveyor will not result in excessive loading of the propelling member nor will the rollers be rotated against the articles with such force as to do damage. Further, the total forward force applied to the articles will be sufficiently reduced that the line pressure applied to the articles will be insufficient to crush the articles or cause them to buckle off the conveyor.

As soon as article B is free to resume its forward motion, the fact that the article B can move will release the shiftable roller 20. Immediately, the springs 23 will take over and with the help of the propelling member roll the shiftable rollers 20 back into vertical alignment above their cooperating pressure rollers 31. Thus, the normal conveying function of the equipment are automatically reestablished. Actually, the springs 23 only have to apply sufficient force to initiate this rolling action. Thereafter, the propelling member will complete the return of the roller to its normal operating position. In many cases the conveyor will operate satisfactorily without the springs. However, they do act as insurance to positively reengage the roller in the event the article is particularly resistant or contact is lost between the roller and the article.

It will be recognized that this conveyor does not provide complete release of the propelling force applied to the articles. Rather, it reduces the force to that which can be tolerated both by the articles and by the equipment and does it by means of a simplified construction which is both fully automatic and entirely dependable. An example of a use of this type of conveyor is at a point along a conventional, fully releasable, automatic accumulator such as the one shown in Patent 3,063,359 where it is known that a lead article will frequently be retarded. A short length of this conveyor employing this invention will apply continuous propelling force to the lead article but at a reduced value. This will provide an automatic starter for the conveyor with minimal loading of the propelling member and its driving equipment.

It will be understood that a preferred embodiment of this invention has been described and that other embodiments of the invention may be made without departing from the principles of the invention. Such embodiments are to be considered as included in the hereinafter appended claims, unless these claims by their language, expressly state otherwise.

I claim:

1. A conveyor having side rails and rotatable members over which articles travel, the rotatable members having a shaft supported by the side rails, a driven flexible propelling member beneath the rotatable members, pressure members at spaced intervals beneath the propelling member and holding the propelling member in driving engagement with the rotatable members; means supporting said pressure members in a fixed vertical position; one of the rotatable members being vertically aligned with each of the pressure members, the conveyor characterized by the side rails having pairs of transversely aligned horizontal slots elongated lengthwise of the conveyor, each pair receiving the shaft of one of the rotatable members vertically aligned with a pressure member with the shaft in abutment with one end of the slot when the rotatable and pressure members are vertically aligned, the slot extending therefrom in the direction of travel of the propelling member; a resilient element biasing the shaft toward the one end; when forward motion of an article in contact with the rotatable member is forcibly arrested, the rotatable member shifting to the other end of the pair of slots where it engages a non-supported portion of the propelling member and the frictional engaging member between it and the propelling member is reduced.

2. A conveyor as described in claim 1 wherein said slots are provided for alternate ones of said rotatable member.

3. A conveyor having side rails and rotatable article propelling rollers mounted on shafts and forming a conveying surface, a driven flexible propelling member and pressure elements in fixed vertical relationship to the propelling rollers supporting the propelling member from beneath in driving contact with the propelling rollers, said pressure elements being vertically aligned at spaced intervals along the conveyor with selected ones of said pressure elements, the conveyor characterized by the side rails having spaced slots elongated lengthwise of the conveyor parallel to said conveying surface for receiving the ends of said shafts of said selected propelling rollers, said slots being equally spaced lengthwise of said conveyor; a pair of resilient elements biasing one at each end of the shaft of each of said selected propelling rollers, urging said selected propelling rollers to the upstream ends of the slots where they are in vertical alignment with their corresponding pressure elements; when forward motion of an article in contact with one of the propelling elements is forcibly arrested, those of said selected propelling rollers in contact with the article being shifted by the propelling member downstream to the other end of the slots where they engage non-supported portions of the propelling member and the frictional engagement between them and the propelling member is reduced.

4. In a conveyor, a conveyor track having side rails and a plurality of conveyor rollers mounted on said side rails, said conveyor rollers forming an article conveying surface, a first group of said conveyor rollers being so mounted that their position with respect to said conveying surface is fixed, a constantly driven flexible propelling member beneath said conveyor rollers in driving contact therewith, the improvement in said conveyor comprising: the remainder of said conveyor rollers forming a second group, means on said rails for mounting rollers of said second group for limited shifting lengthwise of said conveyor parallel to said conveying surface; the conveying rollers of said second group being interspersed between the conveying rollers of said first group; a plurality of pressure rollers beneath said propelling member and holding said propelling member in contact with said second group of conveying rollers and a support therefor holding said pressure rollers in fixed vertical and horizontal position; one of said pressure rollers being provided for each of said conveying rollers of said second group; each of said conveying rollers of said second group being vertically aligned with its cooperating pressure rollers when said conveying rollers are in normal article conveying position and shifting to a position offset therefrom when the movement of an article in contact therewith is arrested to reduce the amount of propelling force transmitted by the propelling member thereto.

References Cited by the Examiner
UNITED STATES PATENTS
3,199,657  8/1965  Harrison _____ 198—127

References Cited by the Applicant
UNITED STATES PATENTS
3,012,652  12/1961  Poel et al.
3,062,359  11/1962  McGow et al.
3,122,232  2/1964  Burt.

EVON C. BLUNK, *Primary Examiner.*

RICHARD E. AEGERTER, *Examiner.*